(12) United States Patent
Palaniappan et al.

(10) Patent No.: US 11,676,153 B2
(45) Date of Patent: Jun. 13, 2023

(54) MANAGING TRANSACTION BLOCKING SCHEMES BASED ON PERFORMANCE DATA VIA A USER INTERFACE

(71) Applicant: MASTERCARD INTERNATIONAL INCORPORATED, Purchase, NY (US)

(72) Inventors: Gnanasivam Palaniappan, O'Fallon, MO (US); Vincent Ferrante, Lake Saint Louis, MO (US); James Stephen Herrmann, Wildwood, MO (US); Rengaram Kuduva Santharam, Chesterfield, MO (US); Baladhandauthabani Dharmaraj, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 97 days.

(21) Appl. No.: 17/006,421

(22) Filed: Aug. 28, 2020

(65) Prior Publication Data
US 2022/0067731 A1  Mar. 3, 2022

(51) Int. Cl.
*G06Q 20/40* (2012.01)
*G06Q 20/38* (2012.01)
(52) U.S. Cl.
CPC ......... *G06Q 20/405* (2013.01); *G06Q 20/382* (2013.01); *G06Q 20/401* (2013.01)
(58) Field of Classification Search
None
See application file for complete search history.

(56) References Cited

U.S. PATENT DOCUMENTS

| 10,115,108 | B1* | 10/2018 | Gendelev | G06Q 20/389 |
| 10,867,303 | B1* | 12/2020 | Manapat | G06Q 20/405 |
| 11,126,988 | B2* | 9/2021 | Dunjic | G06Q 20/202 |
| 2007/0228157 | A1* | 10/2007 | Eckert | G06Q 40/12 |
| | | | | 235/380 |
| 2008/0120129 | A1* | 5/2008 | Seubert | G06Q 40/125 |
| | | | | 705/305 |

(Continued)

*Primary Examiner* — Chrystina E Zelaskiewicz
(74) *Attorney, Agent, or Firm* — Barta, Jones & Foley, PLLC

(57) ABSTRACT

The disclosure herein describes management of transaction blocking schemes via a user interface. A transaction blocking scheme is receiving via the user interface from a user, including transaction blocking rules. The transaction blocking rules are applied to transaction data associated with the user. Transaction blocking scheme performance data is generated based on the application of the transaction blocking rules to the transaction data, including a quantity of transactions of the transaction data that are blocked by the transaction blocking rules. A visualization of the transaction blocking scheme performance data is displayed via the user interface and the user is prompted to provide a response based on the displayed visualization. Based on the response to the prompt, the transaction blocking scheme is activated for application to incoming transactions, whereby the transaction blocking rules are applied to incoming transactions to determine whether to block the incoming transactions.

20 Claims, 7 Drawing Sheets

(56) References Cited

U.S. PATENT DOCUMENTS

| | | | | |
|---|---|---|---|---|
| 2010/0063903 A1* | 3/2010 | Whipple | ............... | G06Q 40/02 705/30 |
| 2012/0233074 A1* | 9/2012 | Dangott | ............... | G06Q 40/06 705/44 |
| 2014/0278494 A1* | 9/2014 | Brown | ................ | G06Q 20/10 705/2 |

* cited by examiner

MANAGING TRANSACTION BLOCKING SCHEMES BASED ON PERFORMANCE DATA VIA A USER INTERFACE

BACKGROUND

In the modern payment landscape, huge quantities of payment transactions are processed between consumers and merchants, with facilitation of the transactions by issuers, acquirers, and payment networks. For merchants and the issuers and/or acquirers that work with them, fraud presents a serious and expensive challenge. Many issuers and acquirers attempt to detect fraud and block, or prevent further processing of, transactions when fraud is detected, but such efforts are often manual processes that are complex and error-prone. Some efforts to block fraudulent transactions overreach and also block many legitimate transactions, which can harm relationships with merchants and/or other customers. Other fraudulent transaction blocking efforts have gaps through which fraud continues to be committed until it is noticed, leading to financial exposure of the parties involved.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for managing transaction blocking schemes is described. A transaction blocking scheme is received via a user interface from a user, wherein the transaction blocking scheme includes at least one transaction blocking rule. The at least one transaction blocking rule is applied to transaction data associated with the user, wherein the transaction data includes at least one of a first data set of historical transaction data or a second data set of transaction data associated with transactions of a current transaction data stream. Transaction blocking scheme performance data is generated based on the application of the at least one transaction blocking rule to the transaction data, wherein the transaction blocking scheme performance data includes at least a quantity of transactions of the transaction data that are blocked by the at least one transaction blocking rule. A visualization of the transaction blocking scheme performance data is displayed via the user interface and the user is prompted to provide a response based on the displayed visualization. Based on the response to the prompting from the user, the transaction blocking scheme is activated for application to incoming transactions, whereby the at least one transaction blocking rule is applied to incoming transactions to determine whether to block the incoming transactions.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 7, the systems are illustrated as schematic drawings. The drawings may not be to scale.

DETAILED DESCRIPTION

Figure 1:
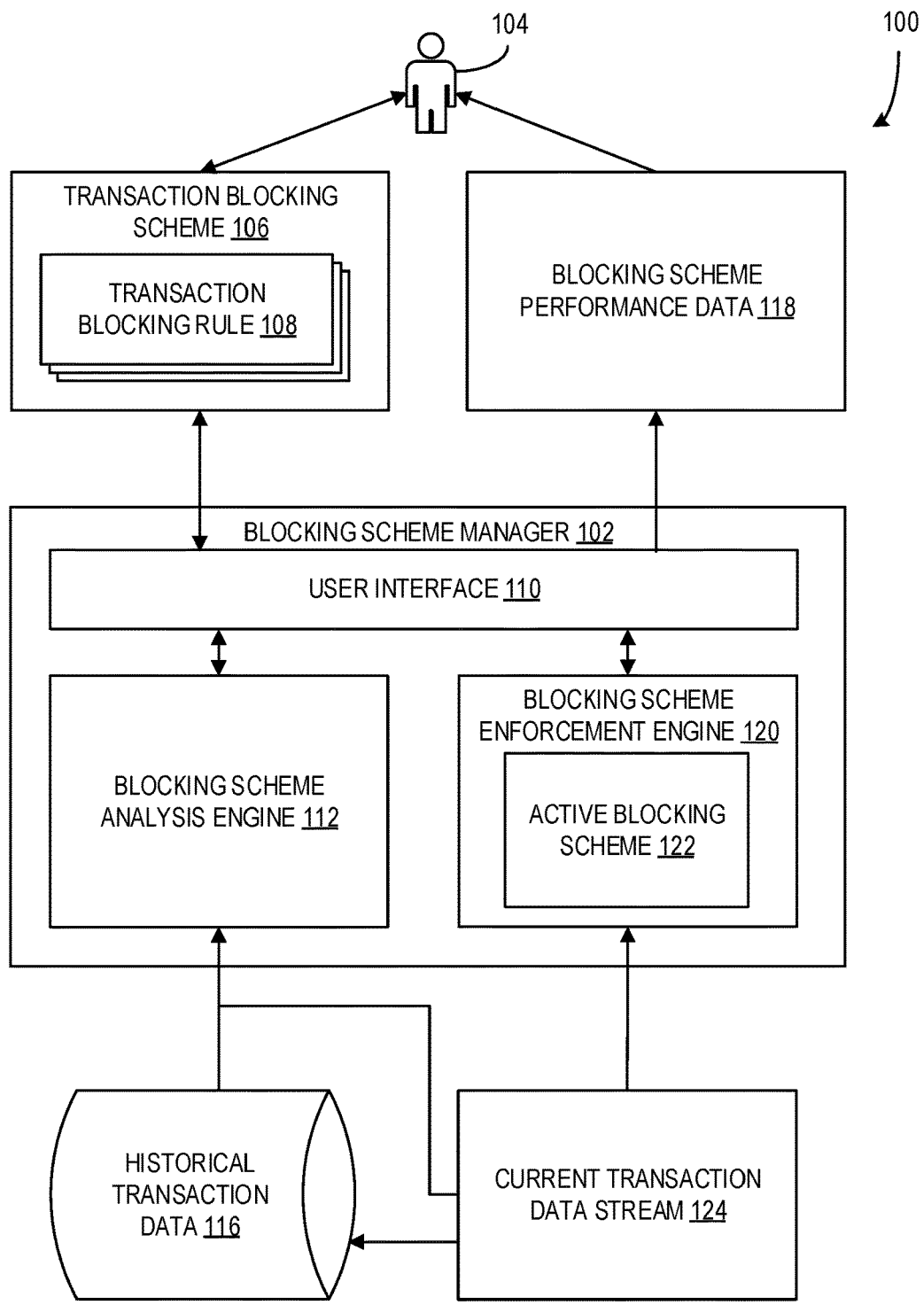
FIG. 1 is a block diagram illustrating a system configured for managing transaction blocking schemes and displaying performance data associated therewith according to an embodiment.

Aspects of the disclosure provide a computerized method and system for managing transaction blocking schemes via a user interface. A transaction blocking scheme is received from a user, via the user interface. The transaction blocking scheme includes information that defines transaction blocking rules (e.g., a rule that blocks a transaction if it is satisfied when applied to the transaction). The transaction blocking rules are applied to transaction data associated with the user. Transaction blocking scheme performance data is generated based on the application of the transaction blocking rules to the transaction data. The performance data includes a quantity of transactions of the transaction data that would be blocked by the transaction blocking rules. A visualization of the transaction blocking scheme performance data is then displayed via the user interface and the user is prompted to provide a response based on the displayed visualization. Based on the response from the user, the transaction blocking scheme is activated for application to incoming transactions, whereby the transaction blocking rules are applied to the incoming transactions to determine whether to block, or prevent further processing of, the incoming transactions.

The disclosure addresses the challenges of managing and evaluating transaction blocking schemes, including enabling users to visualize the performance of transaction blocking schemes based on current or historical transaction data prior to activating the transaction blocking schemes. Further, users are enabled to view performance data of multiple schemes and/or versions of schemes to compare and contrast them and make informed decisions regarding which schemes to activate. The disclosure operates in an unconventional way at least by enabling users to define transaction blocking rules that are associated with a variety of different enforcement layers of a transaction blocking system, wherein each enforcement layer may be configured to apply different types of transaction blocking rules and/or apply rules in defined orders, priorities, or otherwise based on differing system states. Further, the disclosure provides users with a unified user interface that can be used to define and/or update transaction blocking schemes and associated rules, analyze those schemes and/or rules against historical or current transaction data, and to iteratively improve the performance of transaction blocking schemes in a streamlined, user-friendly way, thereby improving the human-machine interface with respect to the described transaction blocking scheme definition process. The use of such improved transaction blocking schemes improves the efficiency and accuracy of computing devices that perform associated fraud detection and prevention processes, such that fraudulent transactions are more frequently and accurately blocked and legitimate transactions are less frequently blocked based on false-positive identification as fraudulent transactions, saving on costs, reducing resource usage, and improving customer service associated with such fraud detection and prevention processes.

FIG. 1 is a block diagram illustrating a system 100 configured for managing transaction blocking schemes (e.g., transaction blocking scheme 106) and displaying performance data (e.g., blocking scheme performance data 118) associated therewith according to an embodiment. The system 100 includes a blocking scheme manager 102 that is configured to receive a transaction blocking scheme 106 from a user 104 via a user interface 110. The blocking scheme manager 102 is further configured to include a blocking scheme analysis engine 112 for analyzing the received transaction blocking scheme 106 based on historical transaction data 116 and/or current, incoming transactions from current transaction data stream 124 and a blocking scheme enforcement engine 120 for applying an active blocking scheme 122 to current transactions from the current transaction data stream 124.

In some examples, the blocking scheme manager 102 is an application or tool provided by a payment network (e.g., MASTERCARD) for use by other entities that are associated with payment transactions that the payment network facilitates. For instance, the user 104 may be associated with an issuer entity that uses the transaction facilitation services of the payment network. In such an example, the user 104 is enabled to create, update, and/or otherwise manage transaction blocking schemes of the issuer entity that are enforced by the payment network (e.g., via a blocking scheme enforcement engine 120 as described herein). It should be understood that, in alternative examples, the blocking scheme manager 102 may be independent of payment networks and/or provided by another entity without departing from the description herein.

The user interface 110 of the blocking scheme manager 102 includes hardware, firmware, and/or software configured to display or otherwise provide one or more interfaces to the user 104 that enable the user 104 to create, edit, or delete a transaction blocking scheme 106 and/or otherwise provide transaction blocking scheme data of the transaction blocking scheme 106 to the blocking scheme manager 102. The user interface 110 is further configured to display or otherwise provide blocking scheme performance data 118 associated with the application of transaction blocking schemes, such as transaction blocking scheme 106 and/or active blocking scheme 122, to transaction data, such as historical transaction data 116 and/or transaction data from the current transaction data stream 124. The user interface 110 is further configured to enable the user 104 to create, edit, or delete one or more transaction blocking rules 108 of the transaction blocking scheme 106.

In some examples, the user interface 110 is configured to display one or more graphical user interfaces (GUIs) to the user 104 and enable the user 104 to interact with those GUIs via user input interfaces and/or devices, such as keyboards, touchscreens, mouse devices, microphones, gesture interfaces, or the like. The user interface 110 may display menus, text fields, buttons, slide bars, and/or other GUI components to gather data about the transaction blocking scheme 106. For instance, the user interface 110 may display a button that is labeled "Create New Transaction Blocking Rule" that, when activated by the user 104, causes the user interface 110 to display a GUI form that prompts the user to provide data associated with a new transaction blocking rule, such as a rule name, a rule expression (e.g., an expression that is evaluated to determine whether the rule is enforced), and/or a rule action or effect (e.g., an action or effect that is performed or otherwise occurs based on evaluation of the rule expression). In many cases, a rule action or effect includes blocking the transaction being evaluated, wherein a transaction is blocked when authorization of the transaction fails or further processing of the transaction is otherwise prevented, but additionally, or alternatively, a rule action or effect may include routing the transaction to one or more other transaction blocking rules for evaluation and/or generating log entries or notification associated with evaluation of the rule. Further explanation and examples of the user interface 110 gathering transaction blocking scheme data from the user 104 are provided below with respect to FIG. 5.

Additionally, or alternatively, the user interface 110 is configured to display blocking scheme performance data 118 to the user 104 through one or more GUI components, such as graphs, tables, text, and/or other types of visualizations. For instance, a table may be displayed that indicates the quantity of blocked transactions per transaction blocking rule 108 of the transaction blocking scheme 106 while a bar graph may be displayed to provide a visual comparison of the performance of each of the blocking rules 108 of the transaction blocking scheme 106 based on the same performance data. Further explanation and examples of the user interface 110 displaying blocking scheme performance data 118 are provided below with respect to FIG. 6. Further, it should be understood that, in other examples, more, fewer, or different types of blocking scheme performance data may be displayed in different ways without departing from the description herein.

The blocking scheme analysis engine 112 includes hardware, firmware, and/or software configured for receiving the transaction blocking scheme 106, including the transaction blocking rules 108, from the user interface 110 and applying that scheme 106 to transaction data from the historical transaction data 116 and/or the current transaction data stream 124. Further, the blocking scheme analysis engine 112 is configured to generate blocking scheme performance data 118 based on the application of the transaction blocking scheme 106 to the transaction data and to provide the generated blocking scheme performance data 118 to the user interface 110, such that it can be displayed or otherwise provided to the user 104 as described herein.

In some examples, the blocking scheme analysis engine 112 is configured to obtain a transaction data set for analysis by requesting it from one or more data stores that store the historical transaction data 116. The transaction data set to be used by the analysis engine 112 may include the transactions that occurred during a defined time range (e.g., the transactions that occurred over the last 30 days) and/or a requested quantity of transactions that are present in the historical transaction data (e.g., the most recent 10,000 transactions in the historical transaction data 116). In some instances, such transaction filters or limitations may be combined (e.g., a set of 1,000 transactions from the last 7 days). Further, the requested transaction data set may be limited to transactions that are associated with the user 104 and/or an entity with which the user 104 is associated (e.g., if the user 104 is an issuer entity or the user 104 is otherwise associated with the issuer entity, the requested transaction data set may include only transactions associated with that issuer entity). In some examples, the transaction of the current transaction data stream 124 is sent to the historical transaction data 116 in the associated data stores over time, such that the current transaction data is stored for use as historical transaction data by the system 100.

In further examples, the blocking scheme analysis engine 112 is configured to apply the transaction blocking scheme 106, including the transaction blocking rules 108, to the obtained transaction data set from the historical transaction data 116. Such application of the transaction blocking rules 108 may include, for instance, evaluating each of the transaction blocking rules 108 for each transaction of the transaction data set to determine which transactions would have been blocked if the transaction blocking scheme 106 had been active at the time the transactions occurred. Alternatively, or additionally, transaction blocking rules 108 may be "nested" or arranged in a hierarchy, such that some rules are defined such that evaluation of a first rule determines whether or not a second rule is applied (e.g., if a transaction satisfies rule A, rule B is applied to that transaction, but if the transaction does not satisfy rule A, rule B is not applied to the transaction). If the transaction blocking rules 108 include such a rules hierarchy, applying the transaction blocking rules 108 to the transaction data set may include applying some or all of the transaction blocking rules 108 according to the hierarchy (e.g., if a transaction does not satisfy rule A, rule B is not applied to the transaction). Alternatively, or additionally, the blocking scheme analysis engine 112 may be configured to apply transaction blocking rules 108 of the transaction blocking scheme 106 individually and/or separately to the transaction data set in order to provide specific performance data associated with each individual transaction blocking rule 108 (e.g., if user 104 includes one new transaction blocking rule 108 in the transaction blocking scheme 106, the user 104 may want to see the performance of that specific rule before activating the updated scheme).

The evaluation of each transaction of the transaction data set results in the generation of the blocking scheme performance data 118 by the analysis engine 112. In some examples, the performance data 118 includes at least one of a quantity of transactions blocked by the transaction blocking scheme 106, quantities of transactions blocked by each rule of the transaction blocking rules 108, quantities of transactions blocked based on the active blocking scheme during the occurrence of those transactions, indicators of transactions that would have been blocked by more than one of the blocking rules 108, which may be used to determine how much blocking rules "overlap", etc. The generated performance data 118 may also include data values that are generated from the raw data (e.g., quantities of transactions blocked), such as a percentage of transactions blocked in the data set, average quantities of blocked transactions over time periods within the data set, time periods when the quantity and/or percentage of blocked transactions exceed defined thresholds ("spikes" of blocked transactions), or the like. Other data values of the performance data 118 may include blocked transactions based on merchant type, blocked transactions based on country, blocked debit transactions compared to blocked credit transactions, and/or blocked transactions with the card present compared to blocked transactions where the card is not present. In some examples, the blocking scheme analysis engine 112 is configured to provide a defined set of blocking scheme performance data 118 when analyzing a transaction blocking scheme 106. Alternatively, or additionally, the blocking scheme manager 102 may be configured to receive a performance data definition request (e.g., a custom set of performance data values and/or other performance data to be generated in association with analysis of the transaction blocking scheme 106) from the user 104 when the user 104 provides a transaction blocking scheme 106. In such cases, the blocking scheme analysis engine 112 may be configured to generate the blocking scheme performance data 118 based on the included performance data definition request, such that the user 104 receives a custom set of performance data 118 based on the analysis of the transaction blocking scheme 106.

In some examples, the application of the transaction blocking rules 108 to the transaction data set of historical transaction data 116 includes the conversion of the transaction blocking rules 108 to equivalent queries (e.g., database queries such as standardized query language (SQL) queries) that are compatible with and can be applied to the historical transaction data 116 in the format in which it is stored on the associated data store or stores. It should be understood that the blocking scheme analysis engine 112 may be configured to convert transaction blocking rules 108 into any type of query that is compatible with the stored historical transaction data 116 without departing from the description herein.

Further, in some examples, historical data is used for analytics. A query retrieves the historical transaction data from a data store for a given time period (e.g., the past 24 hours or the past 48 hours). These records are transformed into a set of transactions to which some or all blocking rules are applied. The transactions are then either blocked or not blocked based on the applied blocking rules and the results are gathered for analysis as described herein.

Additionally, the blocking scheme analysis engine 112 is configured to receive a stream of transaction data associated with the user 104 (e.g., issuer-specific transaction data) from the current transaction data stream 124. In some examples, the current transaction data stream 124 is configured to provide a stream of transactions that are currently being performed, including facilitation by the payment network that provides the blocking scheme manager 102 for use by the user 104. The active blocking scheme 122 that is in use by the blocking scheme enforcement engine 120 of the blocking scheme manager 102 is used to determine whether the transactions of the current transaction data stream 124 are blocked as described herein. By accessing the transactions of the current transaction data stream 124, the blocking scheme analysis engine 112 is enabled to apply transaction blocking rules 108 of the transaction blocking scheme 106 to the current transactions in order to generate predictive blocking scheme performance data 118 that indicates the performance of the transaction blocking scheme 106 on current transactions if it were the active blocking scheme 122. That performance data 118 can be displayed to the user 104 via the user interface 110 as described herein.

The blocking scheme enforcement engine 120 includes hardware, firmware, and/or software configured to apply an active blocking scheme 122 to transactions of a current transaction data stream 124 in order to selectively block some transactions and allow other transactions to be completed. In some examples, the blocking scheme enforcement engine 120 operates as a component of payment transaction facilitation processes of a payment network associated with the blocking scheme manager 102. Such processes further include tokenization operations, authentication processes, and other payment network processes that enable and secure the transfer of funds between accounts during performance of electronic payment transactions of the current transaction data stream 124. While the blocking scheme enforcement engine 120 is illustrated to include a single active blocking scheme 122, in other examples, the enforcement engine 120 may include a plurality of active blocking schemes 122, each of which may be applied to transactions based on the entities associated with those transactions (e.g., there may be active blocking schemes 122 for each issuer entity and/or each acquirer entity associated with transactions of the current transaction data stream 124). Alternatively, or additionally, a plurality of active blocking schemes 122 may be selectively enforced by the enforcement engine 120 based on the occurrence of associated events and/or based on particular dates, times, and/or time ranges.

Further, the blocking scheme enforcement engine 120 is configured to generate blocking scheme performance data 118 in substantially the same manner as the blocking scheme analysis engine 112 described above. The generated performance data 118 may be provided to the user interface 110 for display to the user 104 in real-time or near-real-time as the active blocking scheme 122 is applied to the transactions of the current transaction data stream 124.

Figure 2:
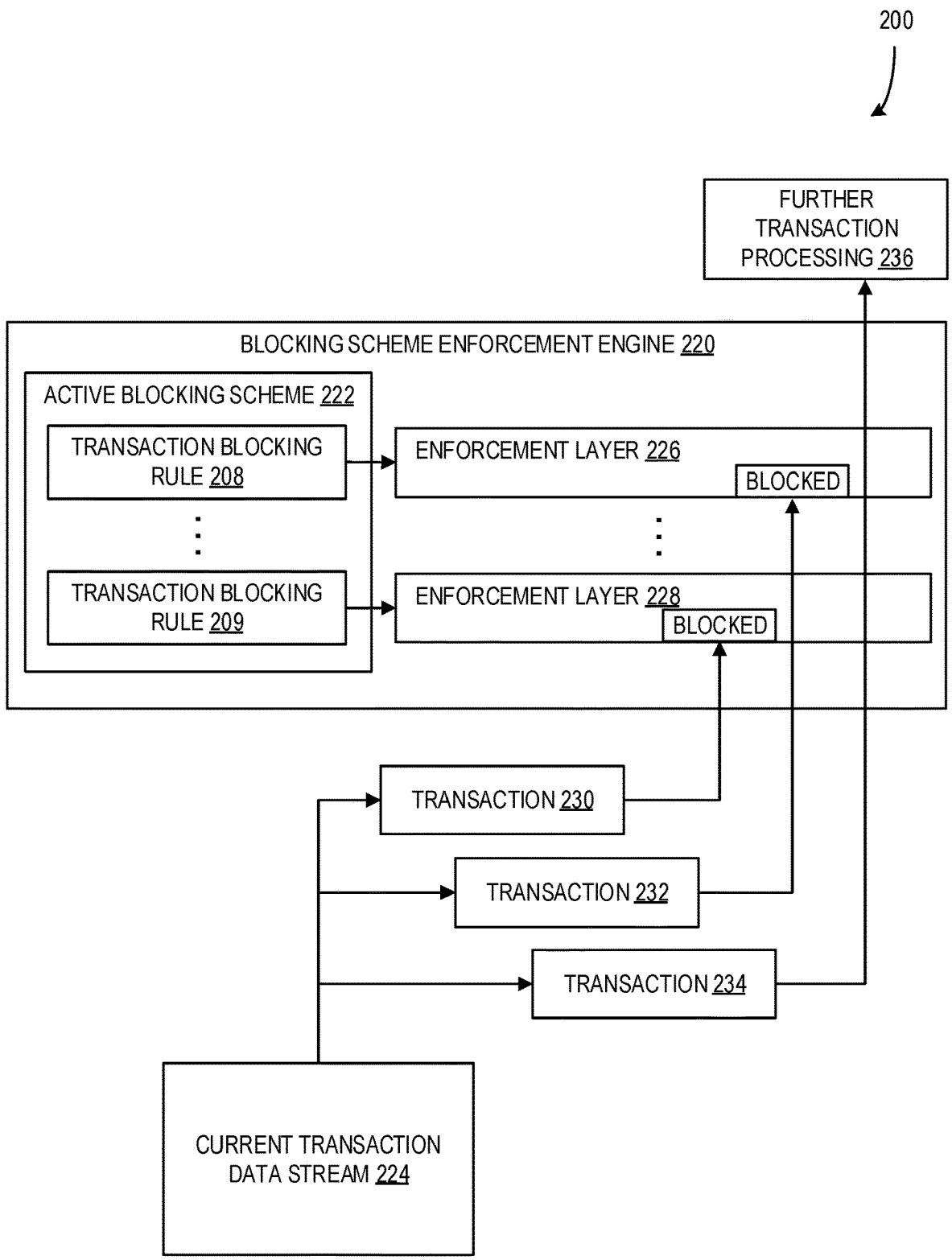
FIG. 2 is a block diagram illustrating a system configured for enforcing an active blocking scheme using a plurality of enforcement layers according to an embodiment.

FIG. 2 is a block diagram illustrating a system 200 configured for enforcing an active blocking scheme 222 using a plurality of enforcement layers 226-228 according to an embodiment. In some examples, the blocking scheme enforcement engine 220 is configured to operate in substantially the same manner as the blocking scheme enforcement engine 120 of FIG. 1 described above. The active blocking scheme 222 is configured to include transaction blocking rules 208-209 which are applied to transactions (e.g., transactions 230, 232, and 234) from the current transaction data stream 224 by at least one of the enforcement layers 226-228. When transactions are not blocked by the active blocking scheme 222, the transactions proceed to further transaction processing 236.

The enforcement layers 226-228 of the enforcement engine 220 are configured to apply some transaction blocking rules of a blocking scheme to transactions from the current transaction data stream 224. The enforcement engine 220 may be configured to include multiple enforcement layers 226-228 that are each configured to apply defined types and/or priorities of transaction blocking rules. For instance, enforcement layer 226 may be configured to apply blocking rules that block defined account number ranges while the enforcement layer 228 may be configured to apply blocking rules that block transactions from particular countries or regions. Additionally, or alternatively, a subset of the enforcement layers 226-228 may be configured to be used by blocking schemes from external entities (e.g., a blocking scheme from an issuer that works with the payment network that controls the enforcement engine 220) while other enforcement layers 226-228 are configured to only be used to apply blocking rules of the entity that is in control of the enforcement engine 220 (e.g., the payment network controlling the enforcement engine 220 may have the capability to apply different types of blocking rules than other entities that use the enforcement engine 220).

In some examples, the enforcement layers 226-228 include a layer (e.g., a MASTERCARD Interface Processor (MIP) layer) configured to block ranges of private account numbers (PANs) as well as sub-criteria within the PAN ranges such as country code filtering, point-of-sale (POS) entry mode filtering, merchant category code filtering, Cardholder Activated Terminal (CAT) level filtering, PAN entry mode filtering, and/or Acquirer ID filtering. Additionally, or alternatively, the enforcement layers 226-228 include a layer (e.g., a "stand-in facility" layer) that is configured to apply transaction blocking rules when an issuer associated with a transaction cannot be reached. These blocking rules may include blocks based on account number ranges and additional sub-criteria, including nested account ranges, X-code-based sub-criteria, or the like. Further, the enforcement layers 226-228 may include one or more backup layers (e.g., enforcement layers that are used if the "stand-in facility" layer is unavailable and/or other entities, such as BANK-NET, are unavailable) that are configured to apply transaction blocking rules that block based on account number range. Such backup layers may or may not be configured to also block transactions based on the sub-criteria used by other layers.

A series of transactions 230, 232, 234 are shown being passed to the enforcement engine 220 such that the active blocking scheme 222 can be applied to each transaction. When the transaction 230 is passed to enforcement layer 228, at least the transaction blocking rule 209 of the active blocking scheme 222 is applied to it. As illustrated, the transaction 230 is blocked in the enforcement layer 228 and does not continue through to the next layer. When the transaction 232 is passed to the enforcement layer 228, it is not blocked and it continues on to enforcement layer 226. At enforcement layer 226, at least transaction blocking rule 208 is applied to the transaction 232 and, as illustrated, the transaction 232 is blocked in enforcement layer 226 and does not continue on. The transaction 234 is passed to enforcement layer 228 and then enforcement layer 226 and is not blocked in either layer. As a result, the transaction 234 proceeds on to further transaction processing 236. It should be understood that, while only two enforcement layers and three transactions are illustrated, in other examples, more, fewer, or different enforcement layers and more, fewer, or different transactions may be used without departing from the description herein.

Figure 3:
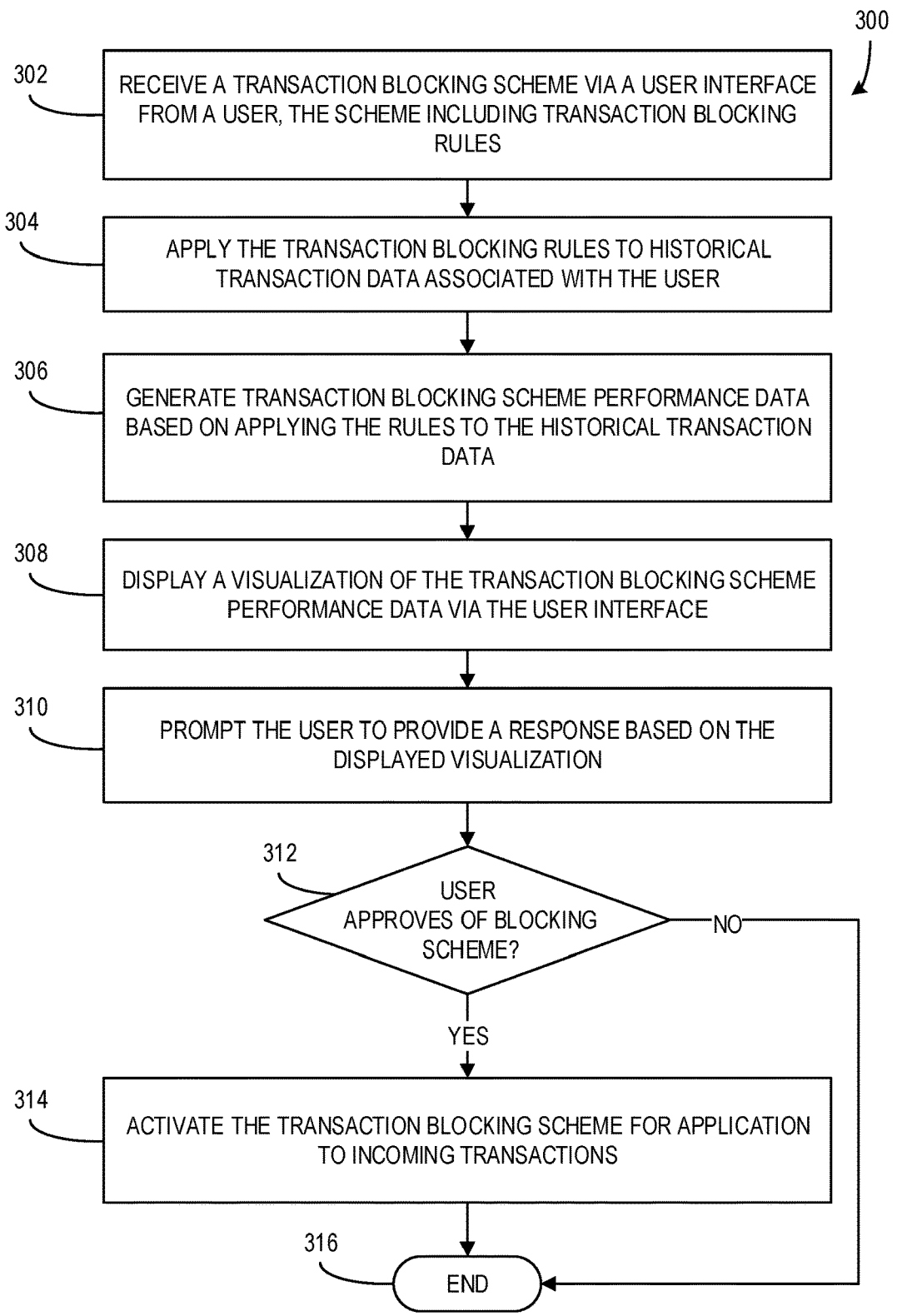
FIG. 3 is a flow chart illustrating a computerized method for creating and activating a transaction blocking scheme via a user interface according to an embodiment.

FIG. 3 is a flow chart illustrating a computerized method 300 for creating and activating a transaction blocking scheme via a user interface according to an embodiment. In some examples, the method 300 may be performed or otherwise implemented on a system (e.g., system 100 of FIG. 1) configured as described herein. At 302, a transaction blocking scheme (e.g., transaction blocking scheme 106) is received via a user interface (e.g., user interface 110) from a user (e.g., user 104). The received transaction blocking scheme includes at least one transaction blocking rule (e.g., transaction blocking rule 108).

At 304, the transaction blocking rule or rules of the received transaction data scheme are applied to historical transaction data (e.g., historical transaction data 116) associated with the user. In some examples, applying the blocking rules to the historical transaction data includes applying the blocking rules to each transaction of a defined set of historical transaction data (e.g., transactions from the past 24 hours or transactions from the past 48 hours). Alternatively, or additionally, applying the blocking rules may include applying the blocking rules to transactions according to an order or hierarchy associated with the transaction blocking scheme and rules, as described herein. Further, in some examples, applying the blocking rules includes simulating a plurality of enforcement layers (e.g., enforcement layers 226-228 of FIG. 2) with which the blocking rules are associated. In such examples, the historical transaction data may be analyzed multiple times in order to simulate various system states associated with the requirements of each of the enforcement layers (e.g., if a first enforcement layer is only active when a second enforcement layer is malfunctioning or otherwise unresponsive, the transaction blocking rules may be applied to the historical transaction data twice in order to observe the performance of the first and second enforcement layers in separate instances).

At 306, transaction blocking scheme performance data is generated based on applying the rules to the historical transaction data. In some examples, the blocking performance data includes data for each transaction of the historical transaction data, such as whether each transaction would have been blocked by the transaction blocking rules and which rules would have blocked the transaction. Further performance data may include time-based data associated with application of the transaction blocking rules (e.g., indicating when transaction blocking rules were applied to transactions, how long evaluation of the transactions with respect to transaction blocking rules took, etc.).

At 308, a visualization of the transaction blocking scheme performance data is displayed via the user interface. In some examples, the visualization of the transaction blocking scheme performance data includes a dashboard interface or similar GUI that provides a user with several ways of viewing the performance data. Such a dashboard may include a list of statistics that apply generally to the application of the scheme to the historical transaction data as well as charts, graphs, or other data visualization tools that provide additional insight into the performance of the scheme (e.g., a chart that indicates how each transaction blocking rule performed in comparison to the other rules, a chart that indicates how many transactions were blocked over time, or the like). Additionally, or alternatively, the visualization may include displaying comparative performance data associated with the application of other transaction blocking schemes to the same historical transaction data, such as a currently active transaction blocking scheme and/or a transaction blocking scheme that was active when the historical transaction data was originally processed. Such comparative data may be shown in proximity to the performance data associated with the transaction blocking scheme being analyzed (e.g., a line graph illustrating performance data with multiple lines of different colors and/or patterns representing the performances of different transaction blocking schemes). An exemplary dashboard is provided and further described below with respect to FIG. 6.

At 310, the user is prompted to provide a response based on the displayed visualization. In some examples, the prompt may be in the form of a GUI that offers the user several buttons or other interactive GUI elements that enable the user to choose a course of action after observing the performance data in the visualization. The prompt may be displayed simultaneously with the performance data (e.g., the buttons of FIG. 6 enabling the user to activate or edit the transaction blocking scheme) and/or some or all of the prompting may be in the form of a separate window or interface, such as a pop-up window.

At 312, if the user responds to the prompt by indicating approval of the blocking scheme, the process proceeds to 314. Alternatively, if the user responds to the prompt by indicating disapproval of the blocking scheme, the process ends at 316. At 314, the transaction blocking scheme is activated for application to incoming transactions based on the user's approval of the blocking scheme. The process then ends at 316. In some examples, activating the transaction blocking scheme at 314 includes transferring the transaction blocking scheme to a blocking scheme enforcement engine (e.g., blocking scheme enforcement engine 120) and application of the transaction blocking scheme to transactions associated with the user by the enforcement engine as they are received in real-time.

Figure 4:
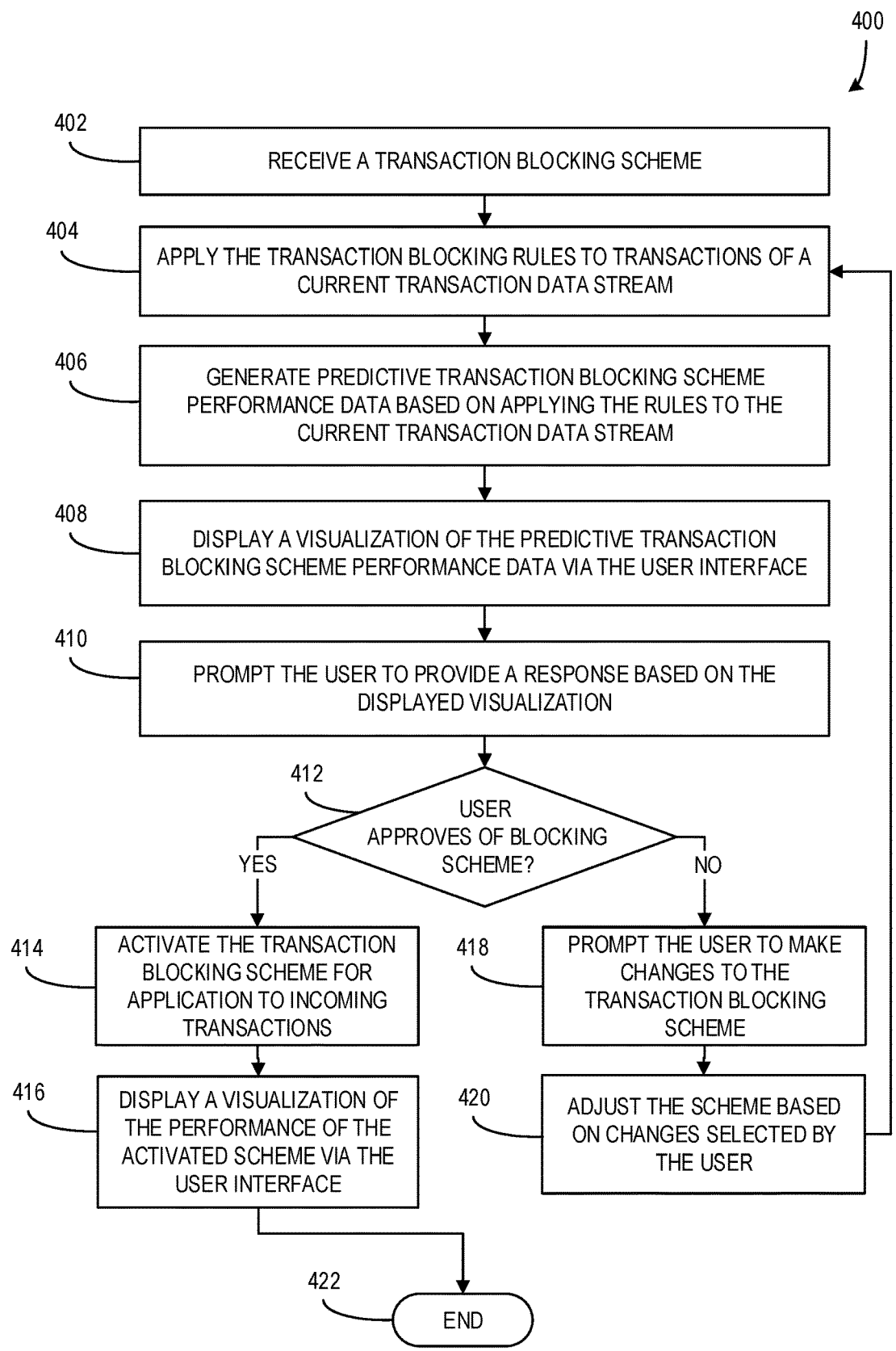
FIG. 4 is a flow chart illustrating a computerized method for creating a transaction blocking scheme and iteratively testing the scheme on a current transaction data stream according to an embodiment.

FIG. 4 is a flow chart illustrating a computerized method 400 for creating a transaction blocking scheme (e.g., transaction blocking scheme 106) and iteratively testing the scheme on a current transaction data stream (e.g., current transaction data stream 124) according to an embodiment. In some examples, the method 400 may be performed or otherwise implemented on a system (e.g., system 100 of FIG. 1) configured as described herein. At 402, a transaction blocking scheme is received via a user interface and, at 404, the transaction blocking rules of the received transaction blocking scheme are applied to transactions of the current transaction data stream. It should be understood that applying the transaction blocking rules to the current transaction data stream includes determining whether the rules would cause transactions of the stream to be blocked if the transaction blocking scheme were actively being enforced. In such cases, a separate active blocking scheme (e.g., active blocking scheme 122) is also being applied to the transactions of the current transaction data stream by a blocking scheme enforcement engine (e.g., blocking scheme enforcement engine 120) as described herein.

At 406, predictive transaction blocking scheme performance data is generated based on the application of the rules to the current transaction data stream. In some examples, the performance data generated is substantially the same as the performance data generated at 306 of FIG. 3 described above, except that it is generated from current transactions in real-time or near real-time, rather than based on a set of historical transaction data. At 408, a visualization of the predictive transaction blocking scheme performance data is displayed via the user interface. In some examples, the visualization displayed at 408 is substantially similar to the visualization described above with respect to 308 of FIG. 3. Alternatively, or additionally, the displayed visualization may be dynamically updated in real-time or near real-time as the transaction blocking rules are applied to transactions from the current transaction data stream. Such performance data may be based on a defined window of time (e.g., performance of the transaction blocking scheme over the past 1 hour, 12 hours, 1 day, etc.).

At 410, the user is prompted to provide a response based on the displayed visualization. It should be understood that the user may be prompted in substantially the same way as described above with respect to 310 of FIG. 3.

At 412, if the user approves of the blocking scheme, the process proceeds to 414. Alternatively, if, at 412, the user does not approve of the blocking scheme, the process proceeds to 418.

At 414, the transaction blocking scheme is activated for application to incoming transactions and, at 416, a visualization of the performance of the activated scheme is displayed via the user interface and the process ends at 422. The real-time or near-real-time display of performance data for the user after the transaction blocking scheme is activated enables the user to monitor the active transaction blocking scheme and, if the user observes undesirable behavior by the transaction blocking scheme, the user may be enabled to revert back to a previous blocking scheme and/or edit the current active blocking scheme to improve such behavior as described herein.

Alternatively, if the user does not approve of the blocking scheme at 412, the user is prompted to make changes to the transaction blocking scheme at 418. In some examples, prompting the user to make changes includes displaying a GUI through which the user is enabled to make changes to the transaction blocking scheme (e.g., the transaction blocking scheme definition GUI 500 of FIG. 5). Alternatively, or additionally, the user may be prompted with suggested changes to the transaction blocking scheme. For instance, if, in disapproving of the transaction blocking scheme, the user indicates that the transaction blocking scheme is blocking too many of the transactions, the user may be prompted with suggested changes that may reduce the number of transactions being blocked (e.g., increasing data value thresholds required to block transactions with one or more of the transaction blocking rules). Further, suggested changes may indicates ways of adjusting the transaction blocking rules to reduce redundancy or overlapping among the transaction blocking rules in order to potentially increase efficiency of the transaction blocking scheme in general.

At 420, the scheme is adjusted based on changes selected by the user and the process returns to 404 where the transaction blocking rules of the adjusted scheme are applied to transactions the current transaction data stream. In some examples, the user is enabled to iteratively review displayed performance data associated with a transaction blocking scheme and adjust that transaction blocking scheme until the user approves of the transaction blocking scheme and activates it for use in application to incoming transactions.

Figure 5:
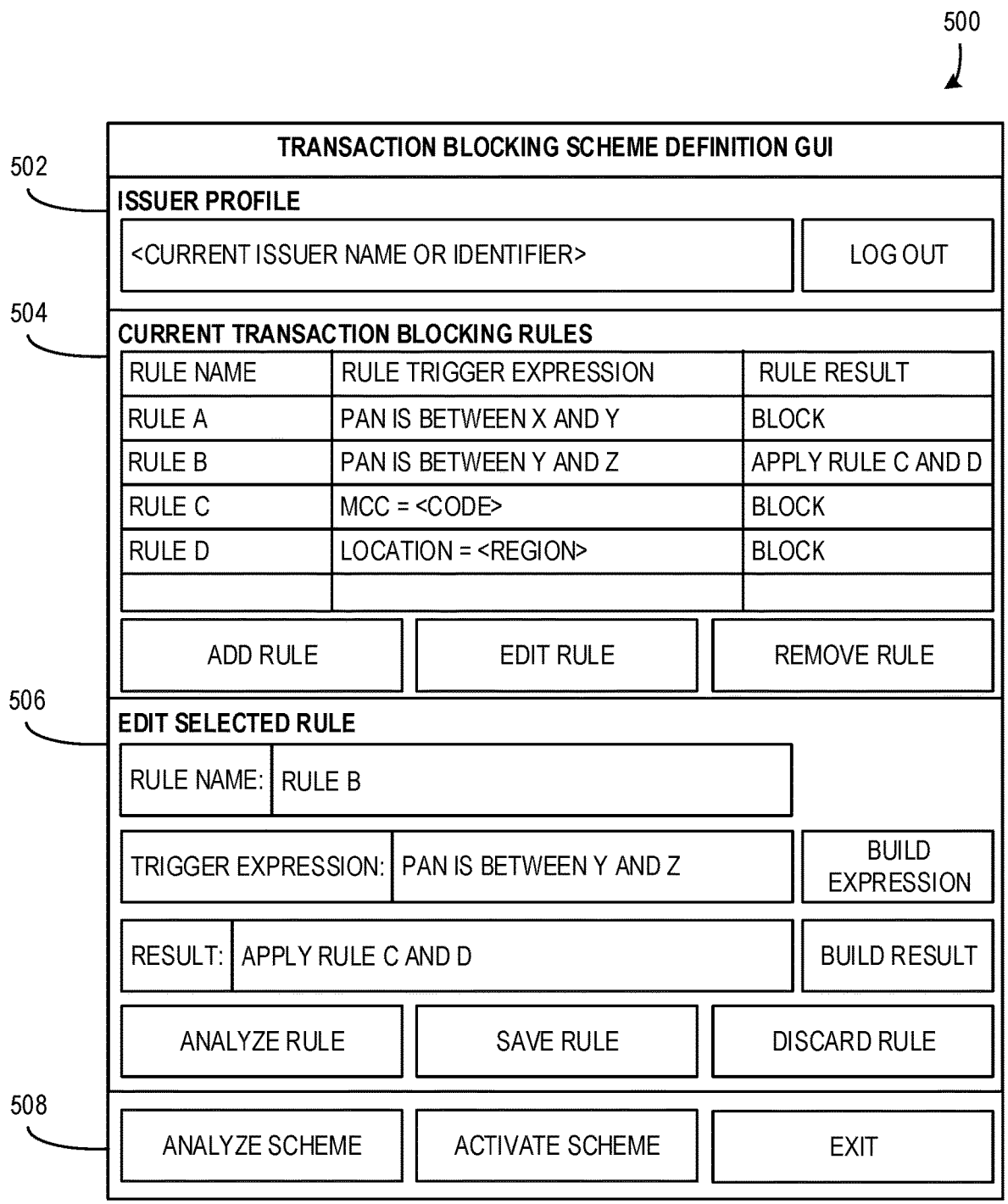
FIG. 5 is a diagram illustrating a graphical user interface (GUI) configured for defining a transaction blocking scheme according to an embodiment.

FIG. 5 is a diagram illustrating a GUI 500 configured for defining a transaction blocking scheme according to an embodiment. In some examples, the GUI 500 may be displayed to the user on a user interface (e.g., user interface 110) of a system (e.g., system 100) configured to enable users to manage transaction blocking schemes as described herein. The GUI 500 includes an issuer profile section 502, a current transaction blocking rules section 504, an edit selected rule section 506, and a main button section 508. The issuer profile section 502 is configured to display information associated with the user that is currently using the GUI 500, including the issuer with which the user is associated. In some examples, prior to reaching the GUI 500, the user must enter login credentials (e.g., username and password, two-factor authentication credentials) associated with a particular issuer, such that transaction blocking schemes that are specific to issuers are secured using the secure login. When logged in, the issuer profile section 502 displays the current issuer name or identifier and also provides a button enabling the user to log out.

The current transaction blocking rules section 504 displays a list of transaction blocking rules that are currently in use with respect to transactions associated with the issuer (e.g., rules of an active transaction blocking scheme) and/or rules that the user has added or edited during the current session using the GUI 500. Rules A-D are illustrated, each rule including a rule trigger expression (e.g., an expression that, when satisfied by data associated with a transaction, performs an action on the transaction) and a rule result (e.g., data indicating the action to be performed when the rule trigger expression is satisfied). In many cases, a rule result may simply be to block the transaction, but the rule result may also cause other rules to be applied (e.g., Rule B causes rules C and D to be applied when satisfied), cause data to be logged, and/or cause notifications or alerts to be sent and/or triggered. In addition to the list of current rules, the section 504 further includes buttons for adding rules, editing rules, and removing rules. Such buttons may be configured such that, when a rule on the list is selected and the "edit rule" button or the "remove rule" button is activated, the action associated with the activated button is performed on the selected button. In the case of the "add rule" button, no rule needs to be selected as a new rule will be added as a result of activation of the button.

The edit selected rule section 506 enables the user to change, update, or otherwise edit aspects of a selected rule from the current transaction blocking rules section 504. Upon the "edit rule" button being pressed, the edit selected rule section 506 may be populated with the current data associated with a selected rule and the user may be enabled to change that data. Changes may include changing the name of the rule, changing the trigger expression of the rule, and/or changing the result action of the rule. The section 506 as illustrated includes a "build expression" button and a "build result" button. In some examples, activation of these buttons causes the GUI 500 to display interfaces that aid the user in the creation of trigger expressions or results, respectively, that are compatible with and interpretable by the system. Such interfaces may include lists of keywords, rule identifiers, and/or variables that may be included in trigger expressions and/or results. For instance, in order to create the illustrated trigger expression ("PAN is between Y and Z"), a build expression interface may enable a user to select a type of available data value (e.g., the PAN) and to define a range of values associated with the selected data value type that indicates when the rule is satisfied.

The edit selected rule section 506 further includes an "analyze rule" button, a "save rule" button, and a "discard rule" button. The "save rule" button is configured to save the rule to the current set of transaction blocking rules based on what is currently entered in the fields of the section 506 and the "discard rule" button is configured to discard any changes made in the fields of the section 506, reverting the selected rule back to its previous version, if a previous version exists. The "analyze rule" button, when activated, may enable the user to analyze the performance of the selected rule by applying the rule to a set of transaction data (e.g., the historical transaction data 116). Activating the "analyze rule" button may cause the GUI 500 to display an interface that provides the performance data of the specific rule to the user (e.g., a performance GUI such as the transaction blocking scheme performance GUI 600 of FIG. 6). However, since only the performance data of a single rule is shown, the displayed interface may include less and/or different performance data from what is displayed when visualizing the performance of the entire transaction blocking scheme as described herein.

The main button section 508 is configured to enable the user to take action with respect to the transaction blocking scheme that is currently shown on the GUI 500. The section 508 includes an "analyze scheme" button, an "activate scheme" button, and an "exit" button. The "analyze scheme" button, when activated, may cause another interface to be displayed that enables the user to view the performance data associated with the application of the transaction blocking scheme to a set of transaction data (e.g., the transaction blocking scheme performance GUI 600 of FIG. 6). Additionally, or alternatively, the "analyze scheme" button may also enable the user to select or otherwise indicate the set of transaction data to be used in analyzing the transaction blocking scheme (e.g., enabling the user to select a set of historical transaction data and/or transaction data from the current transaction data stream). The "activate scheme" button is configured to enable the user to activate the scheme currently displayed in the GUI, causing the scheme to be enforced to block transactions as they come in via the current transaction data stream. The "exit" button is configured to enable the user to exit the GUI 500.

Figure 6:
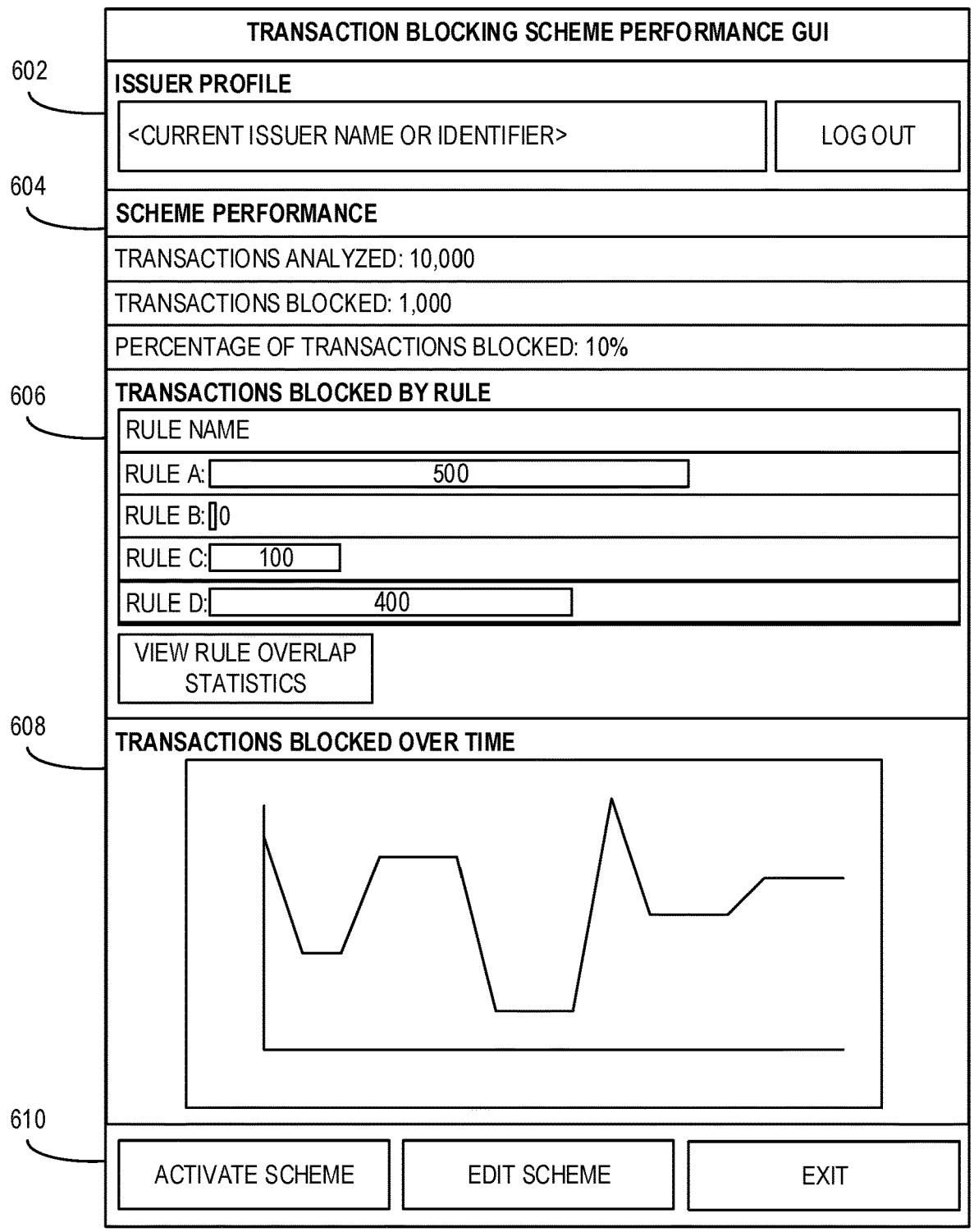
FIG. 6 is a diagram illustrating a GUI configured for viewing performance data of a transaction blocking scheme according to an embodiment.

FIG. 6 is a diagram illustrating a GUI 600 configured for viewing performance data of a transaction blocking scheme according to an embodiment. The transaction blocking scheme performance GUI 600 includes an issuer profile section 605, a scheme performance section 604, a performance per rule section 606, a performance over time section 608, and a main button section 610. In some examples, the GUI 600 may be displayed to the user on a user interface (e.g., user interface 110) of a system (e.g., system 100) configured to enable users to manage transaction blocking schemes as described herein. Further, it should be understood that, in some examples, the issuer profile section 602 operates in substantially the same manner as the issuer profile section 502 of FIG. 5 described above.

The scheme performance section 604 is configured to display overall scheme performance statistics and other data. Section 604 is shown including a "transactions analyzed" entry, a "transactions blocked" entry, and a "percentage of transactions blocked" entry. In other examples, other types of performance data may be shown, such as financial totals of fraud prevented. It should be understood that, in other examples, a scheme performance section may be configured to show more, fewer, and/or different statistics and/or other data values associated with the performance of the transaction blocking scheme.

The performance per rule section 606 includes a list of the rules associated with the transaction blocking scheme being analyzed and a value indicating the number of transactions blocked by the rule. The section 606 further includes bars for each rule sized to provide a visual comparison between each of the rules with respect to the quantity of transactions blocked. It should be understood that, in other examples, more, fewer, or different types of data may be displayed and/or visualized for each rule without departing from the description herein. Further, the section 606 includes a "view rule overlap statistics", which may be configured to enable the user to view statistics associated with overlap between the rules of the transaction blocking scheme (e.g., the quantity of rules blocked by both rule A and Rule C).

The performance over time section 608 includes a line graph indicating a quantity or rate of transactions blocked over time based on timestamps of the transaction to which the transaction blocking scheme is applied. Such a graph provides the user with the capability to identify patterns in how transactions are blocked by the transaction blocking scheme that may be of interest (e.g., such a graph may reveal unacceptable patterns of performance by the scheme that need to be fixed before it is activated).

It should be understood that, while the GUI 600 as illustrated primarily includes the three sections 604, 606, and 608 for displaying performance data of the transaction blocking scheme, in other examples, more, fewer, or different sections may be displayed in such a GUI without departing from the description herein.

Section 610 of GUI 600 includes buttons configured for interacting with the transaction blocking scheme that is being displayed in the GUI 600. The buttons of section 610 include an "activate scheme" button, an "edit scheme" button, and an "exit" button. In some examples, the "activate scheme" button and the "exit" button are configured operate in substantially the same manner as the "activate scheme" and "exit" buttons of section 508 of FIG. 5, respectively. The "edit scheme" button is configured to cause an interface that enables the user to change, update, and/or edit the scheme that is being observed in the GUI 600 (e.g., cause the GUI 500 to be displayed with information associated with the transaction blocking scheme).

Additional Example Scenarios

Aspects of the disclosure enable various additional scenarios, such as next described.

In an example, a user associated with an issuer logs in to a blocking scheme manager system associated with a payment network. The user views a displayed GUI that is configured to enable the user to input information about a transaction blocking scheme and associated transaction blocking rules. The user selects to create a new transaction blocking scheme and enters data to define several transaction blocking rules.

After the user has completed the set of transaction blocking rules, the user selects to analyze the newly defined transaction blocking scheme. The user selects a dataset that includes historical transaction data associated with the issuer from the past month. A blocking scheme analysis engine of the blocking scheme manager applies the transaction blocking rules defined by the user to the selected historical transaction data and generates performance data associated with the transaction blocking scheme as described herein. The generated performance data is displayed to the user in a GUI that includes text associated with the performance data as well as several visualizations that provide additional context for the analysis. After reviewing the displayed performance data, the user is satisfied and selects to activate the transaction blocking scheme, such that the newly defined scheme is provided to a blocking scheme enforcement engine and the associated transaction blocking rules are applied to incoming transactions associated with the issuer to determine whether to block the transactions.

In a further example, after some time has passed, the user returns to the blocking scheme manager system to update the transaction blocking scheme. The user logs in to the system and accesses a GUI that displays information about the currently active transaction blocking scheme. The user edits several of the existing transaction blocking rules and includes several new transaction blocking rules into the scheme. Once finished, the user selects to analyze the transaction blocking scheme, including comparing the performance of the updated transaction blocking scheme with the previous version of the scheme.

The blocking scheme analysis engine applies the transactions blocking rules of the updated version and previous version of the transaction blocking scheme to the same historical transaction data set, generating two sets of performance data. The two sets of performance data are then displayed to the user in a GUI with performance data text and visualizations. The visualizations include graphs and charts that display the performance data of both versions of the scheme side-by-side, in different colors and/or patterns, enabling the user to efficiently identify differences.

The user is not entirely satisfied with the new version of the scheme, and so, they select to return to the GUI that enables them to make edits to the rules. After making several changes, the user selects to analyze the scheme once more. Based on the displayed performance data this time around, the user selects to activate the newest version of the transaction blocking scheme. The blocking scheme manager system replaces the previous version of the scheme with the newest version and the associated transaction blocking rules are applied to transactions to determine whether to block the transactions going forward.

Exemplary Operating Environment

Figure 7:
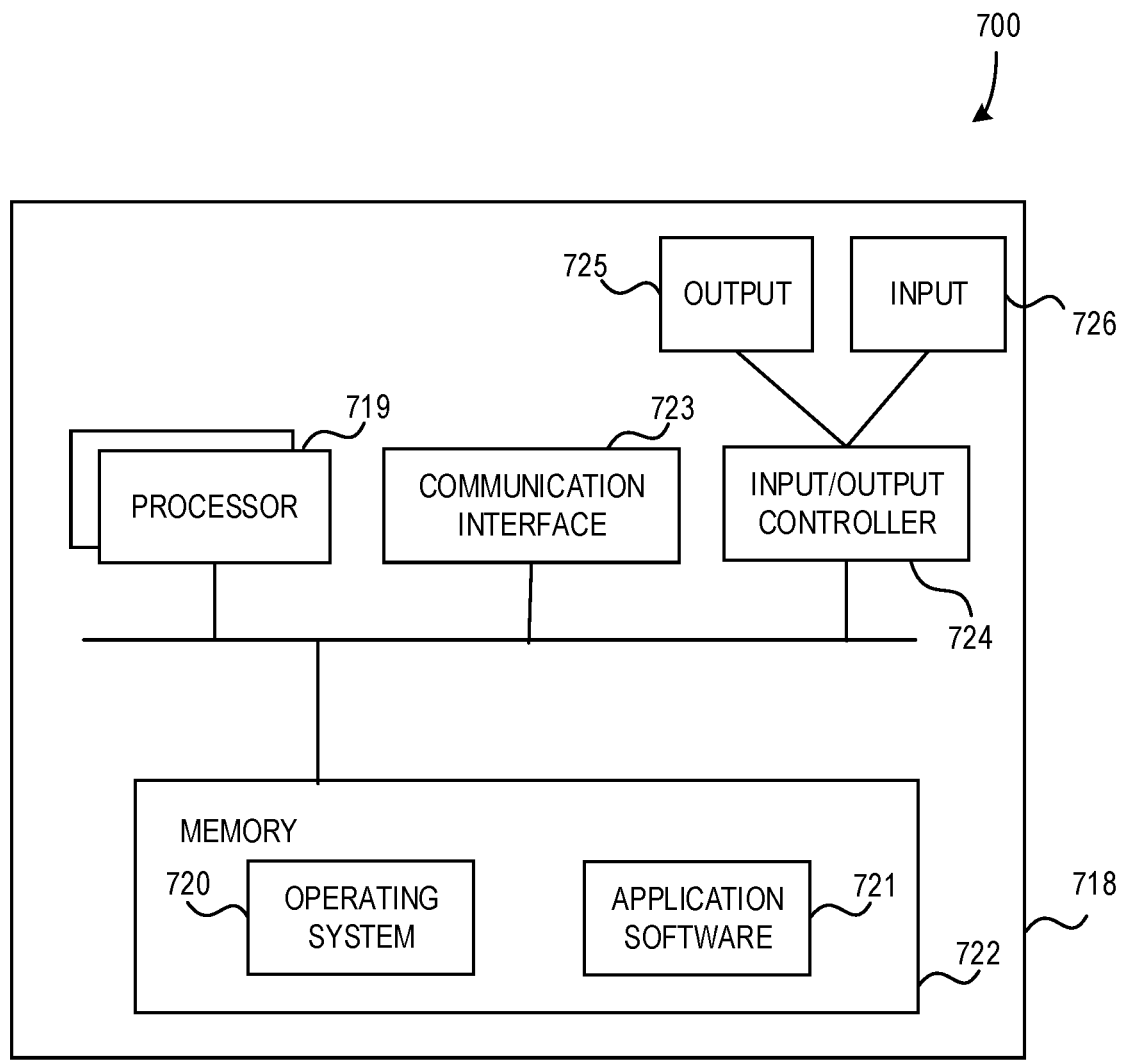
FIG. 7 illustrates a computing apparatus according to an embodiment as a functional block diagram.

The present disclosure is operable with a computing apparatus according to an embodiment as a functional block diagram 700 in FIG. 7. In an embodiment, components of a computing apparatus 718 may be implemented as a part of an electronic device according to one or more embodiments described in this specification. The computing apparatus 718 comprises one or more processors 719 which may be microprocessors, controllers or any other suitable type of processors for processing computer executable instructions to control the operation of the electronic device. Alternatively, or in addition, the processor 719 is any technology capable of executing logic or instructions, such as a hard-coded machine. Platform software comprising an operating system 720 or any other suitable platform software may be provided on the apparatus 718 to enable application software 721 to be executed on the device. According to an embodiment, enabling users to manage and analyze performance of transaction blocking schemes as described herein may be accomplished by software, hardware, and/or firmware.

Computer executable instructions may be provided using any computer-readable media that are accessible by the computing apparatus 718. Computer-readable media may include, for example, computer storage media such as a memory 722 and communications media. Computer storage media, such as a memory 722, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that the storage may be distributed or located remotely and accessed via a network or other communication link (e.g. using a communication interface 723).

The computing apparatus 718 may comprise an input/output controller 724 configured to output information to one or more output devices 725, for example a display or a speaker, which may be separate from or integral to the electronic device. The input/output controller 724 may also be configured to receive and process an input from one or more input devices 726, for example, a keyboard, a microphone or a touchpad. In one embodiment, the output device 725 may also act as the input device. An example of such a device may be a touch sensitive display. The input/output controller 724 may also output data to devices other than the output device, e.g. a locally connected printing device. In some embodiments, a user may provide input to the input device(s) 726 and/or receive output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for managing transaction blocking schemes comprises: at least one processor; and at least one memory comprising computer program code, the at least one memory and the computer program code configured to, with the at least one processor, cause the at least one processor to:

receive a transaction blocking scheme via a user interface from a user, the transaction blocking scheme including at least one transaction blocking rule; apply the at least one transaction blocking rule to transaction data associated with the user, wherein the transaction data includes at least one of a first data set of historical transaction data or a second data set of transaction data associated with transactions of a current transaction data stream; generate transaction blocking scheme performance data based on application of the at least one transaction blocking rule to the transaction data, wherein the transaction blocking scheme performance data includes at least a quantity of transactions of the transaction data that are blocked by the at least one transaction blocking rule; display a visualization of the transaction blocking scheme performance data via the user interface; prompt the user to provide a response based on the displayed visualization; and based on the response to the prompting from the user, activate the transaction blocking scheme for application to incoming transactions of the current transaction data stream, whereby the at least one transaction blocking rule is applied to incoming transactions to determine whether to prevent further processing of the incoming transactions.

A computerized method for managing transaction blocking schemes comprises: receiving, by a processor, a transaction blocking scheme via a user interface from a user, the transaction blocking scheme including at least one transaction blocking rule; applying, by the processor, the at least one transaction blocking rule to transaction data associated with the user, wherein the transaction data includes at least one of a first data set of historical transaction data or a second data set of transaction data associated with transactions of a current transaction data stream; generating, by the processor, transaction blocking scheme performance data based on application of the at least one transaction blocking rule to the transaction data, wherein the transaction blocking scheme performance data includes at least a quantity of transactions of the transaction data that are blocked by the at least one transaction blocking rule; displaying, by the processor, a visualization of the transaction blocking scheme performance data via the user interface; prompting the user, by the processor, to provide a response based on the displayed visualization; and based on the response to the prompting from the user, activating the transaction blocking scheme, by the processor, for application to incoming transactions of the current transaction data stream, whereby the at least one transaction blocking rule is applied to incoming transactions to determine whether to prevent further processing of the incoming transactions.

One or more non-transitory computer storage media have computer-executable instructions for managing transaction blocking schemes that, upon execution by a processor, cause the processor to at least: receive a transaction blocking scheme via a user interface from a user, the transaction blocking scheme including at least one transaction blocking rule; apply the at least one transaction blocking rule to transaction data associated with the user, wherein the transaction data includes at least one of a first data set of historical transaction data or a second data set of transaction data associated with transactions of a current transaction data stream; generate transaction blocking scheme performance data based on application of the at least one transaction blocking rule to the transaction data, wherein the transaction blocking scheme performance data includes at least a quantity of transactions of the transaction data that are blocked by the at least one transaction blocking rule; display a visualization of the transaction blocking scheme performance data via the user interface; prompt the user to provide a response based on the displayed visualization; and based on the response to the prompting from the user, activate the transaction blocking scheme for application to incoming transactions of the current transaction data stream, whereby the at least one transaction blocking rule is applied to incoming transactions to determine whether to prevent further processing of the incoming transactions.

Alternatively, or in addition to the other examples described herein, examples include any combination of the following:

- wherein activating the transaction blocking scheme based on the response to the prompting from the user is further based on the response including approval to activate the transaction blocking scheme from the user; and the method further comprising, based on the response to the prompting from the user including a rejection of the transaction blocking scheme from the user, prompting the user, via the user interface, to update the at least one transaction blocking rule of the transaction blocking scheme.
- further comprising, based on activating the transaction blocking scheme, displaying, by the processor, a visualization of incoming transaction performance data based on application of the at least one transaction blocking rule to the incoming transactions.
- wherein displaying the visualization of the transaction blocking scheme performance data via the user interface further includes displaying the visualization of the transaction blocking scheme performance data in comparison with performance data associated with application of a currently active transaction blocking scheme to the transaction data.
- wherein applying the at least one transaction blocking rule to transaction data further includes: converting the at least one transaction blocking rule into at least one query configured to be applied to the first data set of historical transaction data and to provide results including a subset of transactions of the first data set of historical transaction data that would be blocked by the at least one transaction blocking rule, wherein the transaction blocking scheme performance data is generated based on the provided results.
- wherein the at least one transaction blocking rule includes a plurality of transaction blocking rules, wherein each transaction blocking rule of the plurality of transaction blocking rules is associated with at least one enforcement layer of a plurality of enforcement layers of a transaction blocking scheme enforcement engine, wherein each enforcement layer of the plurality of enforcement layers is configured to apply a type of transaction blocking rule to transactions in a priority order relative to other enforcement layers of the plurality of enforcement layers; and wherein activating the transaction blocking scheme further includes configuring at least one enforcement layer of the plurality of enforcement layers of the transaction blocking scheme engine to apply transaction blocking rules of the plurality of transaction blocking rules with which the at least one enforcement layer is associated.
- wherein the at least one transaction blocking rule includes at least one of a rule for blocking a range of PANs, a rule for blocking based on a country code, a rule for blocking based on point-of-sale entry mode, or a rule for blocking based on merchant category code.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for receiving, by a processor, a transaction blocking scheme via a user interface from a user, the transaction blocking scheme including at least one transaction blocking rule; exemplary means for applying, by the processor, the at least one transaction blocking rule to transaction data associated with the user, wherein the transaction data includes at least one of a first data set of historical transaction data or a second data set of transaction data associated with transactions of a current transaction data stream; exemplary means for generating, by the processor, transaction blocking scheme performance data based on application of the at least one transaction blocking rule to the transaction data, wherein the transaction blocking scheme performance data includes at least a quantity of transactions of the transaction data that are blocked by the at least one transaction blocking rule; exemplary means for displaying, by the processor, a visualization of the transaction blocking scheme performance data via the user interface; exemplary means for prompting the user, by the processor, to provide a response based on the displayed visualization; and based on the response to the prompting from the user, exemplary means for activating the transaction blocking scheme, by the processor, for application to incoming transactions of the current transaction data stream, whereby the at least one transaction blocking rule is applied to incoming transactions to determine whether to prevent further processing of the incoming transactions.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for managing transaction blocking schemes, the system comprising:

at least one processor; and at least one memory comprising computer program code, the at least one memory and the computer program code configured to, with the at least one processor, cause the at least one processor to:

receive a transaction blocking scheme via a first user interface from a user, the transaction blocking scheme including a hierarchy of transaction blocking rules having a hierarchical order;

apply the hierarchy of transaction blocking rules in the hierarchical order to transaction data associated with the user, wherein the transaction data includes at least one data set of historical transaction data;

generate transaction blocking scheme performance data based on application of the hierarchy of transaction blocking rules in the hierarchical order to the transaction data, wherein the transaction blocking scheme performance data includes at least a quantity of transactions of the transaction data that is blocked by the application of the hierarchy of transaction blocking rules;

display, via a second interface, a first visualization of the transaction blocking scheme performance data to the user to respond;

receive an editing of the transaction blocking scheme from the user based on the display of the first visualization;

display, via the second user interface, a second visualization of the transaction blocking scheme performance data based on the application of the edited transaction blocking scheme;

prompt the user to provide a response based on the displayed second visualization;

based on the response to the prompting from the user, activate the edited transaction blocking scheme for application to incoming transactions of a current transaction data stream, whereby the hierarchy of transaction blocking rules is applied to the incoming transactions, in the hierarchical order, to determine whether to prevent further processing of the incoming transactions.

2. The system of claim 1, wherein applying the hierarchy of transaction blocking rules in the hierarchical order to the transaction data comprises evaluating a first rule in the hierarchy and applying a second rule in the hierarchy based on a result of the evaluating of the first rule.

3. The system of claim 1, wherein receiving the editing of the transaction blocking scheme comprises receiving the editing of the transaction blocking scheme via the first user interface.

4. The system of claim 1, wherein displaying, via the second interface, the first visualization of the transaction blocking scheme performance data to the user to respond further includes displaying a visualization of the transaction blocking scheme performance data in comparison with performance data associated with application of a currently active transaction blocking scheme to the transaction data.

5. The system of claim 1, wherein applying the hierarchy of transaction blocking rules, in the hierarchical order, to transaction data further includes:
converting at least one transaction blocking rule into at least one query that applies to the data set of historical transaction data and to provide results including a subset of transactions of the data set of historical transaction data that would be blocked by the hierarchy of transaction blocking rules, wherein the transaction blocking scheme performance data is generated based on the provided response.

6. The system of claim 1, wherein the hierarchy of transaction blocking rules includes a plurality of transaction blocking rules, wherein each transaction blocking rule of the plurality of transaction blocking rules is associated with at least one enforcement layer of a plurality of enforcement layers of a transaction blocking scheme enforcement engine, wherein each enforcement layer of the plurality of enforcement layers apply a type of transaction blocking rule to transactions in a priority order relative to other enforcement layers of the plurality of enforcement layers; and
wherein activating the edited transaction blocking scheme further includes at least one enforcement layer of the plurality of enforcement layers of the transaction blocking scheme enforcement engine applying transaction blocking rules of the plurality of transaction blocking rules with which the at least one enforcement layer is associated.

7. The system of claim 1, wherein the hierarchy of transaction blocking rules includes at least one of a rule for blocking a range of primary account numbers (PANs), a rule for blocking based on a country code, a rule for blocking based on point-of-sale entry mode, or a rule for blocking based on merchant category code.

8. A computerized method for managing transaction blocking schemes, the method comprising:
receiving, by a processor, a transaction blocking scheme via a first user interface from a user, the transaction blocking scheme including a hierarchy of transaction blocking rules having a hierarchical order;
applying, by the processor, the hierarchy of transaction blocking rules in the hierarchical order to transaction data associated with the user, wherein the transaction data includes at least one data set of historical transaction data;
generating, by the processor, transaction blocking scheme performance data based on application of the hierarchy of transaction blocking rules to the transaction data, wherein the transaction blocking scheme performance data includes at least a quantity of transactions of the transaction data that is blocked by the application of the hierarchy of transaction blocking rules;
displaying, by the processor via a second interface, a first visualization of the transaction blocking scheme performance data to the user to respond;
receiving an editing of the transaction blocking scheme from the user based on the display of the first visualization;
displaying, via the second user interface, a second visualization of the transaction blocking scheme performance data based on the application of the edited transaction blocking scheme;
prompting the user to provide a response based on the displayed second visualization;
based on the response to the prompting from the user, activating the edited transaction blocking scheme, by the processor, for application to incoming transactions of a current transaction data stream, whereby the hierarchy of transaction blocking rules is applied to the incoming transactions, in the hierarchical order, to determine whether to prevent further processing of the incoming transactions.

9. The computerized method of claim 8, wherein applying the hierarchy of transaction blocking rules in the hierarchical order to the transaction data comprises evaluating a first rule in the hierarchy and applying a second rule in the hierarchy based on a result of the evaluating of the first rule.

10. The computerized method of claim 8, wherein receiving the editing of the transaction blocking scheme comprises receiving the editing of the transaction blocking scheme via the first user interface.

11. The computerized method of claim 8, wherein displaying, via the second interface, the first visualization of the transaction blocking scheme performance data to the user to respond further includes displaying the visualization of the transaction blocking scheme performance data in comparison with performance data associated with application of a currently active transaction blocking scheme to the transaction data.

12. The computerized method of claim 8, wherein applying the hierarchy of transaction blocking rules to transaction data further includes:
converting at least one transaction blocking rule into at least one query that applies to the data set of historical transaction data and to provide results including a subset of transactions of the data set of historical transaction data that would be blocked by the hierarchy of transaction blocking rules, wherein the transaction blocking scheme performance data is generated based on the provided response.

13. The computerized method of claim 8, wherein the hierarchy of transaction blocking rules includes a plurality of transaction blocking rules, wherein each transaction blocking rule of the plurality of transaction blocking rules is associated with at least one enforcement layer of a plurality of enforcement layers of a transaction blocking scheme enforcement engine, wherein each enforcement layer of the plurality of enforcement layers apply a type of transaction blocking rule to transactions in a priority order relative to other enforcement layers of the plurality of enforcement layers; and
wherein activating the edited transaction blocking scheme further includes at least one enforcement layer of the plurality of enforcement layers of the transaction blocking scheme engine applying transaction blocking rules of the plurality of transaction blocking rules with which the at least one enforcement layer is associated.

14. The computerized method of claim 8, wherein the hierarchy of transaction blocking rules includes at least one of a rule for blocking a range of primary account numbers (PANs), a rule for blocking based on a country code, a rule for blocking based on point-of-sale entry mode, or a rule for blocking based on merchant category code.

15. One or more non-transitory computer storage media having computer-executable instructions for managing transaction blocking schemes that, upon execution by a processor, cause the processor to at least:
receive a transaction blocking scheme via a first user interface from a user, the transaction blocking scheme including a hierarchy of transaction blocking rules having a hierarchical order;
apply the hierarchy of transaction blocking rules in the hierarchical order to transaction data associated with the user, wherein the transaction data includes at least one data set of historical transaction data;
generate transaction blocking scheme performance data based on application of the hierarchy of transaction blocking rules to the transaction data, wherein the transaction blocking scheme performance data includes at least a quantity of transactions of the transaction data that is blocked by the application of the hierarchy of transaction blocking rules;
display, via a second interface, a first visualization of the transaction blocking scheme performance data to the user to respond;
receive an editing of the transaction blocking scheme from the user based on the display of the first visualization;
display, via the second user interface, a second visualization of the transaction blocking scheme performance data based on the application of the edited transaction blocking scheme;
prompt the user to provide a response based on the displayed second visualization;
based on the response to the prompting from the user, activate the edited transaction blocking scheme for application to incoming transactions of a current transaction data stream, whereby the hierarchy of transaction blocking rules is applied to the incoming transactions, in the hierarchical order, to determine whether to prevent further processing of the incoming transactions.

16. The one or more non-transitory computer storage media of claim 15, wherein applying the hierarchy of transaction blocking rules in the hierarchical order to the transaction data comprises evaluating a first rule in the hierarchy and applying a second rule in the hierarchy based on a result of the evaluating of the first rule.

17. The one or more non-transitory computer storage media of claim 15, wherein receiving the editing of the transaction blocking scheme comprises receiving the editing of the transaction blocking scheme via the first user interface.

18. The one or more non-transitory computer storage media of claim 15, wherein displaying, via the second interface, the first visualization of the transaction blocking scheme performance data to the user to respond further includes displaying a visualization of the transaction blocking scheme performance data in comparison with performance data associated with application of a currently active transaction blocking scheme to the transaction data.

19. The one or more non-transitory computer storage media of claim 15, wherein applying the hierarchy of transaction blocking rules to transaction data further includes:
converting at least one transaction blocking rule into at least one query that applies to the data set of historical transaction data and to provide results including a subset of transactions of the data set of historical transaction data that would be blocked by the hierarchy of transaction blocking rules, wherein the transaction blocking scheme performance data is generated based on the provided response.

20. The one or more non-transitory computer storage media of claim 15, wherein the hierarchy of transaction blocking rules includes a plurality of transaction blocking rules, wherein each transaction blocking rule of the plurality of transaction blocking rules is associated with at least one enforcement layer of a plurality of enforcement layers of a transaction blocking scheme enforcement engine, wherein each enforcement layer of the plurality of enforcement layers apply a type of transaction blocking rule to transactions in a priority order relative to other enforcement layers of the plurality of enforcement layers; and
wherein activating the edited transaction blocking scheme further includes at least one enforcement layer of the plurality of enforcement layers of the transaction blocking scheme enforcement engine applying transaction blocking rules of the plurality of transaction blocking rules with which the at least one enforcement layer is associated.

* * * * *